Sept. 15, 1964  R. BROWN  3,148,798
PROTECTIVE CLOSURE
Filed Nov. 30, 1961

INVENTOR.
ROBERT BROWN
BY
Charles L. Lovenshah
attorney 333,148,798
Patented Sept. 15, 1964

3,148,798
PROTECTIVE CLOSURE
Robert Brown, Erie, Pa., assignor to Niagara Plastics, Inc., Erie, Pa., a corporation of Pennsylvania
Filed Nov. 30, 1961, Ser. No. 156,046
1 Claim. (Cl. 220—42)

This invention relates to closures and, more particularly, to a closure in the form of a plug which can be used wherever it is desired to close an opening or to enclose the end of a projecting part such as the end of a pipe.

This application is a continuation in part of patent application, Serial No. 778,183, filed December 4, 1958, now abandoned.

The device disclosed herein may be used as a dust and moisture seal and as a shipping protector for threads, pipe, tubing ends, and the like. Other uses are in connection with masking parts for paint spraying or electroplating where high temperature ovens or baths are not involved. The device is also advantageously used in intraplant shipping protection and as a protector in handling and plant storage. The closure is used on tubing, fittings, valves, automotive, aircraft, and hydraulic parts, and has many other applications.

One of the principal objects of this invention is to provide a low cost, easily applied, and easily removed closure in the form of a plug which will reliably adhere to the part to be protected and provide the desired protection thereto, such as providing protection to the threads, both inside and outside, on the part.

Another object of the invention is to provide a closure in which one size of closure can be used for a range of sizes of parts to be protected and a central handle is placed in each.

Still another object of the invention is to provide a closure which can be rapidly molded by injection molding and which, in particular, can be rapidly removed from the molding apparatus.

A further object of the invention is to provide a closure which provides an adequate seal even when applied to pipes or projections of the largest size which the plug is capable of accepting with a handle which will not interfere.

A still further object of the invention is to provide a cup shaped, frusto-conical closure which is made of a highly flexible plastic having good form stability and the proper wall thickness and degree of taper to firmly adhere in good sealing relation to the part to be protected and, at the same time, be capable of being easily removed therefrom by means of a plug handle.

Yet a further object of this invention is to provide a closure which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
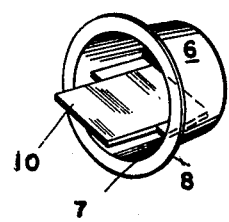
FIG. 1 is an isometric view of a plug according to the invention.
Figure 2:
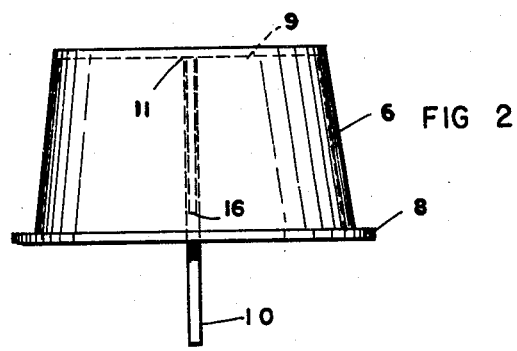
FIG. 2 is a side view of the plug shown in FIG. 1.
Figure 3:
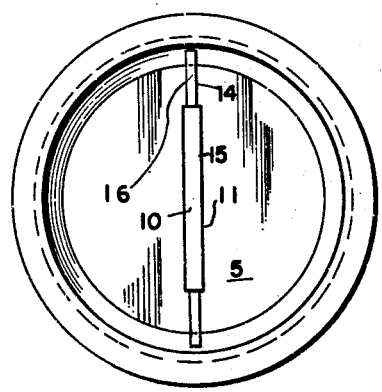
FIG. 3 is a top view of the plug.

Now with more particular reference to the drawing, the closure shown herein is a generally frusto-conical cup shaped device having a rim 8 extending outwardly therefrom. The cup shaped device has a side wall 6 and a bottom 5. The rim or flange 8 is generally flat and extends outwardly from the side wall 6 to a distance at least one-fourth the depth of the cup shaped device.

A handle 10 is attached to the bottom at 11 for assisting in the removal and application of the plug as well as for reinforcing it and holding its thin flexible walls in shape. The handle 10 has a thick plate like intermediate portion 15 which is generally rectangular in cross section and is attached to the side wall by webs 14 which are somewhat thinner than the handle 10 and are integrally attached to the inside edge of the side wall 6. The webs 14 terminate slightly below the rim 8 at 16. The intermediate handle 10 is approximately three times as wide as the webs 14 so that a substantial reinforcing member is provided at the center of the plug.

The closure may be made of polyethylene and has critical geometric proportions. To permit adapting itself as a plug in providing the necessary seal, the thickness or the wall 6 should be in the range of from .025 to .040 inch. The degree of taper of the wall 6 relative to its axis is also critical, this wall taper preferably being in the order of a ten degree inclined angle and necessarily being in the range of from five degrees to a fifteen degree inclined angle. In other words, the angularity of the side wall 6, viewed in cross section relative to the axis thereof, is in the range of from two and five-tenths degrees to seven and five-tenths degrees.

From the foregoing, it will be seen that the present invention provides a closure which, by reason of being made of polyethylene, has a high degree of strength, flexibility, and form stability to adapt itself, either as a plug or as a cap, to parts of different sizes and at even slightly different shapes and to provide a firmly adherent and adequate protective seal. It will also be seen that because of this flexibility, the closures may be easily and quickly removed. The polyethylene closure must be made within the dimensional ranges indicated; namely, a wall thickness of the wall 6 of from .025 to .040 inch and a taper of the wall 6 of from five degrees to fifteen degrees inclined angle of from two and five-tenths degrees to seven and five-tenths degrees relative to the axis of the wall 6. The axial dimension of the wall 6 is preferably such that the internal diameter of the closure at its mouth is from one-sixteenth to three-sixteenth inch greater than the internal diameter of the wall 6 across the bottom 5.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

As an article of manufacture, a closure comprising in its unmounted condition a single body having a circular end wall, the angularity of said side wall relative to the .025 to .040 inch, an enlarging frusto-conical side wall projecting axially from the margin of said end wall being of substantially uniform thickness of from .025 to .040 inch for at least the greater part of its distance from said end wall, the angularity of said side wall relative to the axis thereof being from two and five-tenths to seven and five-tenths degrees, the axial length of said side wall being such that the internal diameter at the rim thereof is from one-sixteenth to three-sixteenths inch greater than the internal diameter thereof across said end wall and forming inner and outer parallel frusto-conical working faces adapted to engage securely, respectively, with male and female generally cylindrical parts, an annular flange of substantially the same wall thickness as said side wall projecting outwardly from the rim of said side wall at the open end thereof, a flat plate like handle substantially the same thickness as said rim attached to the inside surface of said end wall a distance equal to at least one-fourth the depth of said closure and extending out from the open end thereof, and webs attaching said handle to the inside of the walls of said closure, said webs being co-planar with said handle and approximately half the thickness of said handle, said web terminating below the rim of said closure at a distance approximately one-fourth the depth of said closure whereby said closure may be used to cap a pipe.

References Cited in the file of this patent

UNITED STATES PATENTS

| | | |
|---|---|---|
| 2,173,843 | Hothersall | Sept. 26, 1939 |
| 2,266,270 | Roth | Dec. 16, 1941 |
| 2,663,451 | Yornall | Dec. 22, 1953 |
| 2,737,205 | Stringfield | Mar. 6, 1956 |
| 3,065,767 | Topf | Nov. 27, 1962 |